United States Patent [19]

Shirai

[11] Patent Number: 4,787,790

[45] Date of Patent: Nov. 29, 1988

[54] STUD FASTENING ASSEMBLY

[75] Inventor: Yoji Shirai, Kanagawa, Japan

[73] Assignee: Rexnord Inc., Torrance, Calif.

[21] Appl. No.: 183,740

[22] PCT Filed: Dec. 23, 1986

[86] PCT No.: PCT/US86/02799

§ 371 Date: Aug. 24, 1987

§ 102(e) Date: Aug. 24, 1987

[87] PCT Pub. No.: WO87/03942

PCT Pub. Date: Jul. 2, 1987

[51] Int. Cl.$^4$ .............................................. F16B 37/12
[52] U.S. Cl. .................................. 411/109; 411/178; 411/968
[58] Field of Search ................ 411/103, 105, 107–109, 411/112, 113, 178, 180, 452, 453, 167, 168, 968; 403/281, 320

[56] References Cited

U.S. PATENT DOCUMENTS 2,400,318  5/1946  Rosan ................................. 411/373
4,568,228  2/1986  Rosan, Jr. .......................... 411/178

Primary Examiner—Neill R. Wilson
Attorney, Agent, or Firm—Pretty, Schroeder, Brueggemann & Clark

[57] ABSTRACT

A stud fastening assembly 10 including a stud 11 having a threaded end threadable into a hole 15 formed in a workpiece 16 and a plurality of serrated rings 21 and 22 for securing the stud in place. The serrated rings include inner serrations 20 sized to slidably engage longitudinal serrations 14 formed on a mid-section of the stud and further include outer serrations 19 configured to engage the sidewalls of the hole formed in the workpiece and thereby prevent relative rotation. The lower ring includes fewer outer serrations than does the upper ring, to facilitate installation.

4 Claims, 3 Drawing Sheets

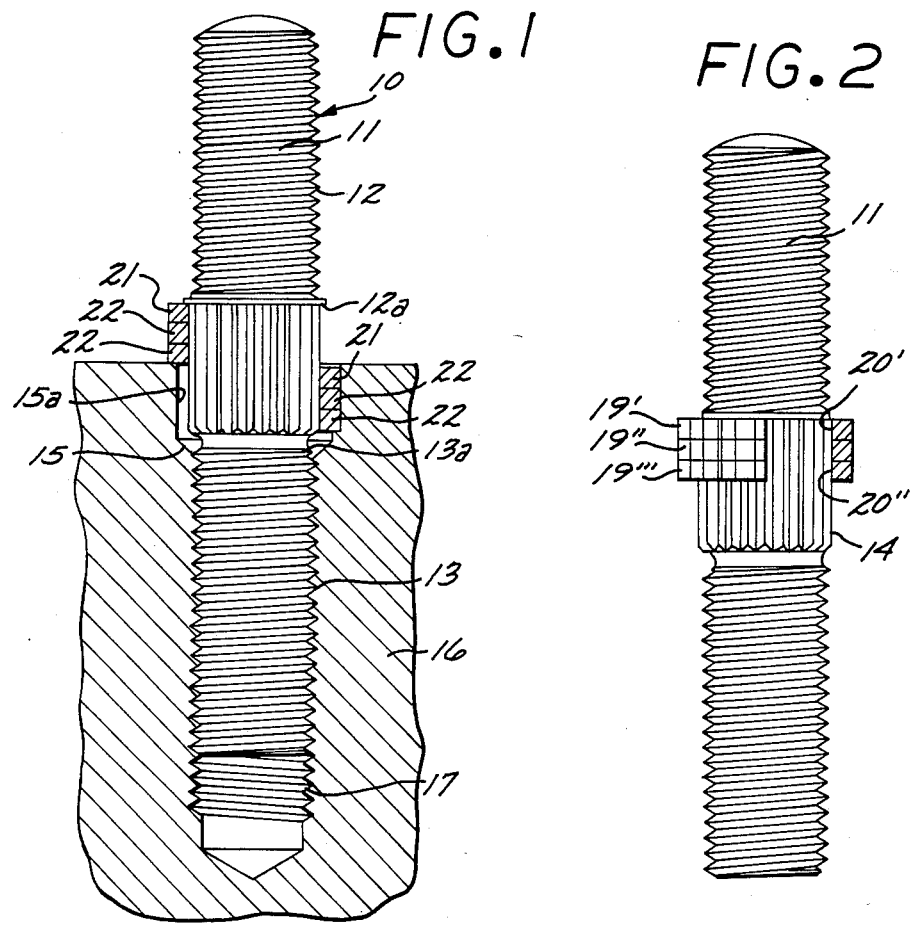
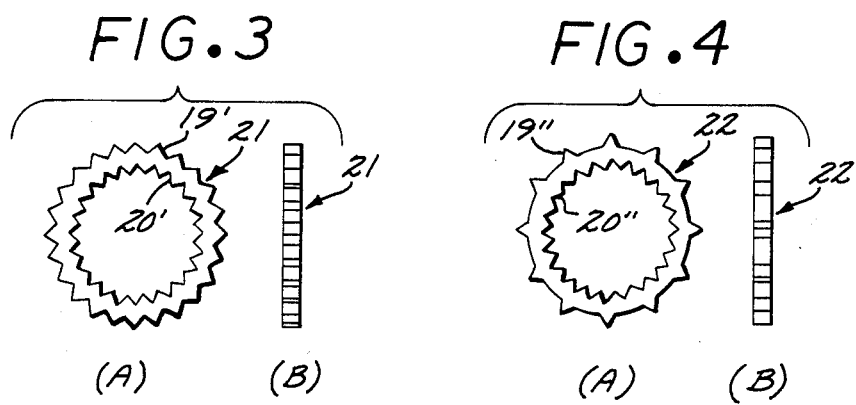

(A)    (B)

STUD FASTENING ASSEMBLY

BACKGROUND OF THE INVENTION

This invention relates generally to stud fasteners, and, more particularly, to a stud fastening assembly secured to a workpiece by a serrated ring.

A typical example of a stud fastening assembly of this kind is illustrated in Japanese Patent Publication No. 43389/72. As shown in FIGS. 7, 8(a) and 8(b), a stud fastening assembly 10 includes a main body or stud 11 provided with male threads 12 and 13. The main body is threadably inserted into a machined hole 15 of a workpiece 16 and further threadably engaged with an internal thread 17. The main body 11 is provided with a longitudinal serration 14 located between the innermost incomplete screw threads 12a and 13a of external threads 12 and 13.

A fastening ring 18 is provided with an outer serration 19 and an inner serration 20. The inner serration 20 is slidably engaged with the longitudinal serration 14 of the main body 11.

The outer diameter of the external threads 12 and 13 of the main body 11 are larger than the inner diameter of the inner serration 20 of the fastening ring 18. Even if a relative axial movement with respect to the main body 11 is applied to the fastening ring 18, this axial movement is limited under an engagement with either of the incomplete screw threads 12a and 13a. Therefore, the fastening ring 18 forms an engagement member which is integral with the main body, forming a stud fastening assembly.

When the main body 11 of the bolt is threadably inserted to the desired depth in a workpiece 16, an axial force is applied to the uppermost part of the fastening ring 18 and the outer serration 19 is set in a hole 15a, which is slightly smaller than the serration's outer diameter. Material of the workpiece positioned between the individual outer serrations 19 may apply a resistance force against a rotational movement of the fastening ring. Since a relative engagement between the inner serration 20 of the fastening ring 13 and the outer serration 14 of the main body 11 prohibits a rotational movement of the main body 11, no helical movement of the main body 11 is produced, causing the stud fastening assembly to be kept at its close integral engagement with the workpiece 16.

The fastening ring 18 for the stud fastening assembly has an integral form carrying both the outer serration 19 and the inner serration 20, and its axial thickness is larger than its radial thickness. This causes its press machining and plastic work to be difficult, requiring either a cutting work or a sintering formation of powder metal ceramics to be performed. However, such a machining process has a low productivity, and a reduction in cost is difficult.

SUMMARY OF THE INVENTION

This invention is embodied in a stud fastening assembly having a plurality of overlapping rings, each of which has an inner serration and an outer serration. The plurality of rings are made such that the number of teeth of the outer serration of the upper ring is larger than the number of teeth of the outer serration of the lower ring. With this configuration, it is possible to make a press machining that enables a mass production. Further, the plurality of rings function the same as the single ring of the conventional type of integral assembly.

BRIEF DESCRIPTION OF THE DRAWINGS

FIG. 1 is an elevational view in section showing a stud fastening assembly of the present invention, in which a stud is threadedly engaged in a workpiece, and three overlapped fastening rings having serrations are shown at the left side and right side of the stud, for indicating a condition before and after they are displaced to their fastening positions in the workpiece.

FIG. 2 is a view showing the stud fastening assembly, with the fastening rings being positioned around the stud, and with the fastening rings being shown in section at the right side of the stud.

FIGS. 3(a) and (b) are a top plan view and a side elevational view, respectively, of one ring of the stud fastening assembly of the present invention.

FIGS. 4(a) and (b) are a top plan view and a side elevational view, respectively, of a second ring of the stud fastening assembly, to be applied below the ring of FIGS. 3(a) and (b).

DESCRIPTION OF THE PREFERRED EMBODIMENT

Figure 5:
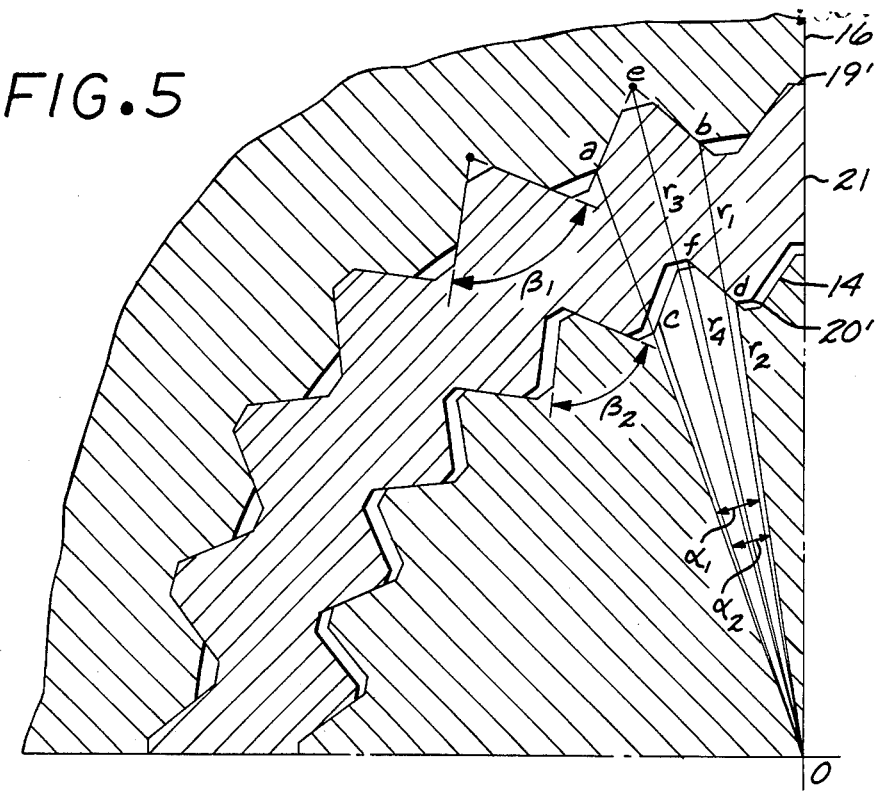
FIG. 5 is a cross-sectional view showing a condition in which the fastening ring of FIGS. 3(a) and (b) is displaced to a fastening position in the workpiece.
Figure 6:
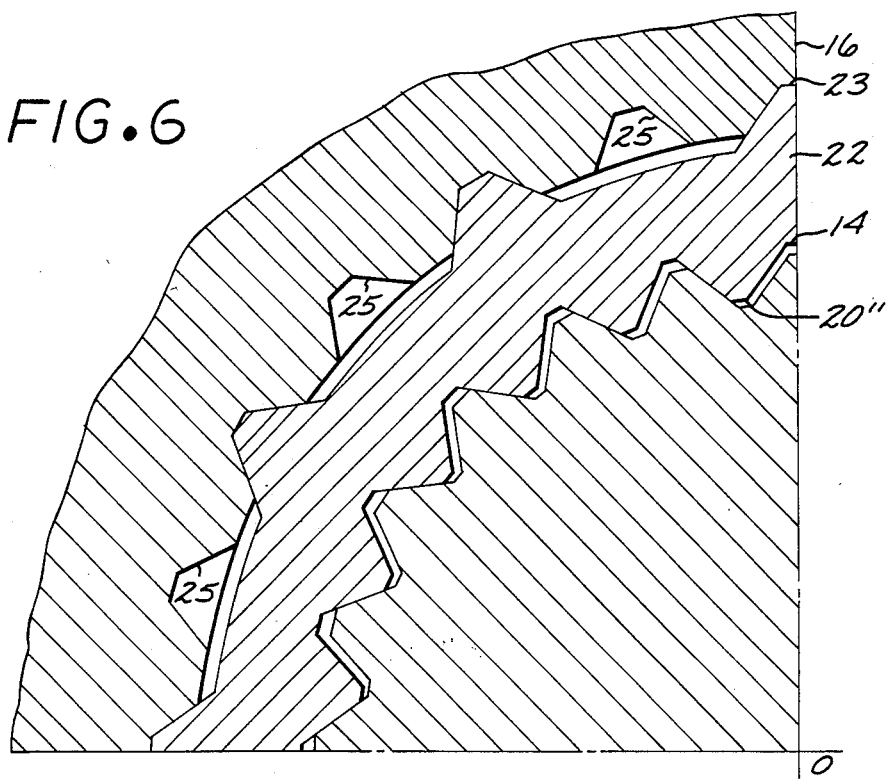
FIG. 6 is a cross-sectional view similar to FIG. 5 showing a condition in which the fastening ring of FIGS. 4(a) and (b) is displaced to a fastening position in the workpiece.
Figure 7:
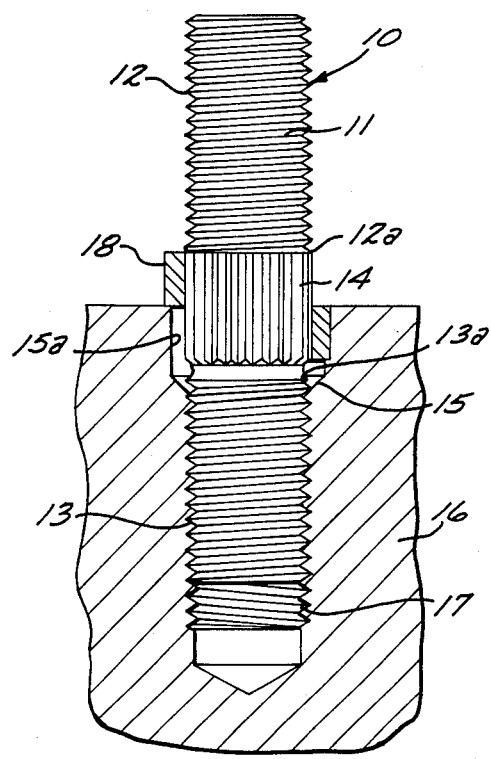
FIG. 7 is an elevational view in section showing a prior art assembly for stud fastening assembly, wherein a single fastening ring with serrations is shown at its left side and right side for a condition before and after it is displaced to a fastening position in the workpiece.
Figure 8:
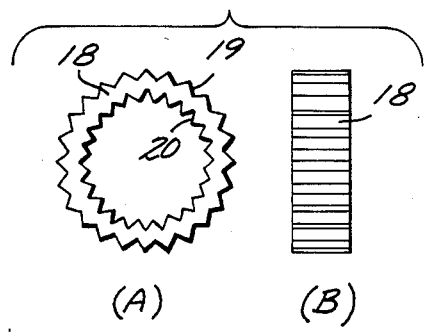
FIGS. 8(a) and (b) are a top plan view and a side elevational view, respectively, of the prior art fastening ring of FIG. 7.

With reference now to FIGS. 1–6 of the drawings, there is shown a stud fastening assembly 10 in accordance with the invention. The assembly includes an elongated stud 11 and upper and lower overlapping fastening rings 21 and 22, respectively, having a combined thickness the same as that of a conventional, one-piece ring (FIGS. 8(a) and (b)). As shown in FIG. 1, the lower fastening ring 22 is initially displaced from its fastened position in a hole 15a of a workpiece 16. The fastened lower ring is also shown in FIG. 6.

The upper fastening ring 21 is then fastened as shown in FIG. 5. Since a serration 23 is already machined in the hole 15a of the workpiece 16 by the lower fastening ring 22, an outer serration 19' of the ring 21 is made only with a machining of a screw thread 25 of a phantom serration, shown in FIG. 6. The numbers of teeth of the conventional type of ring (FIGS. 8(a) and (b)) are the same as the number of teeth of the outer serrations (19 and 19') of the upper ring 21 (FIGS. 3(a) and (b)). Since the number of teeth of the outer serration 19" of the lower ring 22 (FIGS. 4(a) and (b)) is 50% that of the conventional type ring, a load for displacing the ring to its fastened position is reduced by about 50%. As shown in FIGS. 4(a) and (b), even if the number of teeth is reduced by about 50% from that of the conventional type ring, no problem may occur under the following consideration and rather the product may easily be installed.

When a load is applied to the stud fastening assembly, if the number of teeth of the serrations 14 of the stud 11 bolt is the same as that of the outer serration, such a load as above applied to the outer serration is low due to a larger circumference and radius than that of the stud. Therefore, a rate in which the loads applied to the serration of the main body of the stud bolt and the outer serration become equal is calculated for a trial.

In reference to FIG. 5, each of the sizes in the serration of the main body of the stud bolt and the outer serration is defined as follows:

| | |
|---|---|
| Radius of workpiece hole ($\overline{ob}$) | $r_1$ |
| Virtual radius of outer serration ($\overline{oe}$) | $r_3$ |
| Inner radius of inner serration ($\overline{od}$) | $r_2$ |
| Virtual radius of serration of stud ($\overline{of}$) | $r_4$ |
| Internal angle of outer serration ($\angle aeb$) | $\beta_1$ |
| Angle of thread at stud serrations ($\angle cfd$) | $\beta_2$ |
| Shearing angle of one tooth of an outer serration ($\angle aob$) | $\alpha_1$ |

Shearing angle of one tooth of a stud serration: $\alpha_2$ ($\angle cod$)

$$\frac{\overline{ab}}{2} = (r_3 - r_1)\tan\frac{\beta_1}{2} \quad (1)$$

$$\frac{\overline{cd}}{2} = (r_4 - r_2)\tan\frac{\beta_2}{2} \quad (2)$$

$$\sin\frac{\alpha_1}{2} = \frac{\frac{\overline{ab}}{2}}{r_1} \quad (3)$$

$$\sin\frac{\alpha_2}{2} = \frac{\frac{\overline{cd}}{2}}{r_2} \quad (4)$$

$$ab = \frac{2\pi r_1}{360} \times \alpha_1 \quad (5)$$

$$cd = \frac{2\pi r_2}{360} \times \alpha_2 \quad (6)$$

A ratio of a sectional area of each of the serrations to which a shearing force is applied is expressed as ab:cd.

Taking into account a rate in which a torque is applied, the following equations can be expressed:

$$T = f_1 \times r_1 \quad (7)$$

$$T = f_2 \times r_2 \quad (8)$$

Therefore:

$$f_1 = \frac{T}{r_1} \quad (9)$$

$$f_2 = \frac{T}{r_2}, \quad (10)$$

and $f_1:f_2$ becomes $$\frac{T}{r_1} : \frac{T}{r_2},$$

where
A torque applied to one thread of the stud: $T$
A force applied to one thread of the stud: $f_2$
Force applied to one thread of an outer serration: $f_1$
Inner radius of an inner serration: $r_2$
Radius of the workpiece hole: $r_1$ Since this means that a shearing force is inversely proportional to radius, assuming a rate of sectional area described above, a ratio of shearing force per unit area, where each of the threads of the serrations may receive, can be expressed as:

$$\frac{cd \times r_2}{ab \times r_1} \times 100.$$

Calculation of terms for M8 is as follows:

$r_1 = 4.88 \quad r_2 = 3.68 \quad r_3 = 5.52$
$r_4 = 4.18 \quad \beta_1 = \beta_2 = 75$ $$\frac{\beta_1}{2} = \frac{\beta_2}{2} = 37.5 \tan(37.5) = 0.7673$$

$$\frac{\overline{ab}}{2} = (5.52 - 4.88) \times 0.7673 = 0.491$$

$$\frac{\overline{cd}}{2} = (4.18 - 3.68) \times 0.7673 = 0.384$$

$$\sin\frac{\alpha_1}{2} = \frac{0.491}{4.88} = 0.1006$$

$$\sin\frac{\alpha_2}{2} = \frac{0.384}{3.68} = 0.1043$$

$$\frac{\alpha_1}{2} = 5.774 \quad \alpha_1 = 11.55$$

$$\frac{\alpha_2}{2} = 5.987 \quad \alpha_2 = 11.97$$

$$\frac{ab = 2\pi r_1}{360} \times \alpha_1 = \frac{2\pi \times 4.88}{360} \times 11.55 = 0.492$$

$$\frac{cd = 2\pi r_1}{360} \times \alpha_2 = \frac{2\pi \times 3.68}{360} \times 11.55 = 0.371$$

Replacing these numerical values with a term of $$\frac{cd \times r_2}{ab \times r_1} \times 100$$

results in the following equation:

$$\frac{0.371}{0.492} \times \frac{3.68}{4.88} \times 100 = 56.9\%$$

That is, since a shearing force per unit area applied to an outer serration corresponds to 56.9% of that of the serration of the bolt, if the number of threads of the outer serration corresponds to 56.9% of that of the serration of the stud, i.e. that of the inner serration, it may equal the load applied to the inner serration. Therefore, if the number of threads of the outer serration is more than 56.9%, no problem may be generated. Thus, if the fastening ring is made such that three rings are overlapped to each other as shown in FIG. 1, wherein one lower fastening ring 21 and two fastening upper rings 22 are applied, the rate is 100% due to the fact that the number of threads of the lower fastening ring 21 is the same as that of the inner serration. The number of threads of the upper fastening ring 22 can be 100+50+50=200, if it is 50% of that of the inner serration. Considering its rate with three rings being corresponded to 300%, the value may become 200—300×100=66.7%, since this value is larger than 56.9%, no problem may occur in view of its mechanical strength.

As shown in FIG. 6, when the lower fastening ring 22 is fixed in the hole 15a of the workpiece 16 and the upper fastening ring 21 is overlapped on the former ring as shown in FIG. 5, the serration 19' is fixed to the thread 25 of the virtual serration of the hole and the function of the fastening ring is achieved.

In view of the foregoing description, it should be appreciated that the fastening ring of present invention is made to have an overlapped plate type ring to enable a press machining operation to be performed, to make its mass production a stable quality and to provide a reduction in its cost, while providing the same function as that of the conventional type, integral ring.

Although the present invention has been described in detail with reference to the preferred embodiment, it is apparent that the preferred embodiment is a mere illustrative example and various modifications can be applied thereto without departing from the principle of the present invention.

I claim:

1. A stud fastening assembly comprising:
   a stud having a end section adapted to threadedly engage a threaded hole in a workpiece and further having a central section with longitudinal serrations; and
   lower and upper fastening rings, each ring having inner serrations complementary to the longitudinal serrations of the stud and outer serrations configured to engage the threaded hole in the workpiece, wherein the lower and upper fastening rings are positioned to encircle the stud, and wherein the lower ring includes fewer outer serrations than does the upper ring.

2. A stud fastening assembly as defined in claim 1, wherein the lower fastening ring includes about one-half the number of outer serrations of the upper ring.

3. A stud fastening assembly as defined in claim 1, wherein each of the fastening rings has an axial thickness less than the its radial thickness.

4. A stud fastening assembly as defined in claim 1, and further including an intermediate fastening ring having inner serrations complementary to the longitudinal serrations of the stud and outer serrations configured to engage the threaded hole in the workpiece, wherein the intermediate ring is positioned to encircle the stud, between the lower and upper rings, and wherein the outer serrations of the intermediate ring correspond in number to the outer serrations of the upper ring.

* * * * *